US011895744B2

(12) United States Patent
Schlipf

(10) Patent No.: US 11,895,744 B2
(45) Date of Patent: Feb. 6, 2024

(54) ELECTRIC TUBULAR HEATING ELEMENT AND RELATED METHOD

(71) Applicant: Türk & Hillinger GmbH, Tuttlingen (DE)

(72) Inventor: Andreas Schlipf, Tuttlingen (DE)

(73) Assignee: TÜRK & HILLINGER GMBH, Tuttlingen (DE)

( * ) Notice: Subject to any disclaimer, the term of this patent is extended or adjusted under 35 U.S.C. 154(b) by 628 days.

(21) Appl. No.: 17/069,810

(22) Filed: Oct. 13, 2020

(65) Prior Publication Data

US 2021/0112634 A1 Apr. 15, 2021

(30) Foreign Application Priority Data

Oct. 15, 2019 (DE) ..................... 10 2019 127 692.6

(51) Int. Cl.

| | |
|---|---|
| ***H05B 3/03*** | (2006.01) |
| ***H05B 3/06*** | (2006.01) |
| ***H05B 3/44*** | (2006.01) |
| ***H05B 3/48*** | (2006.01) |
| ***H05B 3/52*** | (2006.01) |

(52) U.S. Cl.

CPC ................. *H05B 3/48* (2013.01); *H05B 3/03* (2013.01); *H05B 3/06* (2013.01); *H05B 3/44* (2013.01); *H05B 3/52* (2013.01)

(58) Field of Classification Search

None

See application file for complete search history.

(56) References Cited

U.S. PATENT DOCUMENTS

| | | | | |
|---|---|---|---|---|
| 3,521,352 A * | 7/1970 | Volker | H05B 3/06 | 219/544 |
| 3,591,771 A * | 7/1971 | Volker | H05B 3/06 | 219/544 |
| 9,468,041 B2 * | 10/2016 | Gros | H05B 1/0244 | |
| 2014/0151363 A1 | 6/2014 | Gros D'Aillon | | |
| 2016/0057813 A1 | 2/2016 | Schlipf | | |
| 2021/0112629 A1 * | 4/2021 | Schlipf | H05B 3/02 | |

(Continued)

FOREIGN PATENT DOCUMENTS

| | | |
|---|---|---|
| CN | 102984834 A | 3/2013 |
| CN | 103650060 A | 3/2014 |

(Continued)

OTHER PUBLICATIONS

KR20070009828A, Jan. 2007, Lee et al, partial translation (Year: 2007).*

(Continued)

*Primary Examiner* — Joseph M. Pelham

(74) *Attorney, Agent, or Firm* — Panitch Schwarze Belisario & Nadel LLP

(57) ABSTRACT

An electrical tubular heating element is disclosed with a tubular metal sheath, in whose interior an electrical heating element is arranged, which is formed from a resistive wire and is electrically insulated from the tubular metal sheath at least in sections by an electrically insulating material, in which the resistive wire, from which the electrical heating element is formed, is penetrated by at least one opening and/or has a contoured peripheral surface. A method for manufacturing such an electrical tubular heating element is also disclosed.

14 Claims, 11 Drawing Sheets

(56) References Cited

U.S. PATENT DOCUMENTS

| | | | | |
|---|---|---|---|---|
| 2021/0112632 | A1* | 4/2021 | Schlipf | H05B 3/08 |
| 2021/0298130 | A1* | 9/2021 | Schlipf | B21D 51/16 |
| 2022/0110191 | A1* | 4/2022 | Schlipf | H05B 3/06 |

FOREIGN PATENT DOCUMENTS

| | | | | |
|---|---|---|---|---|
| CN | 208353641 | U | 1/2019 | |
| EP | 3883338 | A1 * | 9/2021 | |
| KR | 20070009828 | A * | 1/2007 | |
| WO | WO-2021054857 | A1 * | 3/2021 | H05B 3/48 |

OTHER PUBLICATIONS

KR20070009828A, Jan. 2007, Lee et al, Bib data sheet (Year: 2007).*

Chinese Office Action dated Aug. 4, 2022 in Application No. CN 202011096383.9.

* cited by examiner 150
154
155
156
157
158
160
164
167
168
174
178
184
184a
184b
188

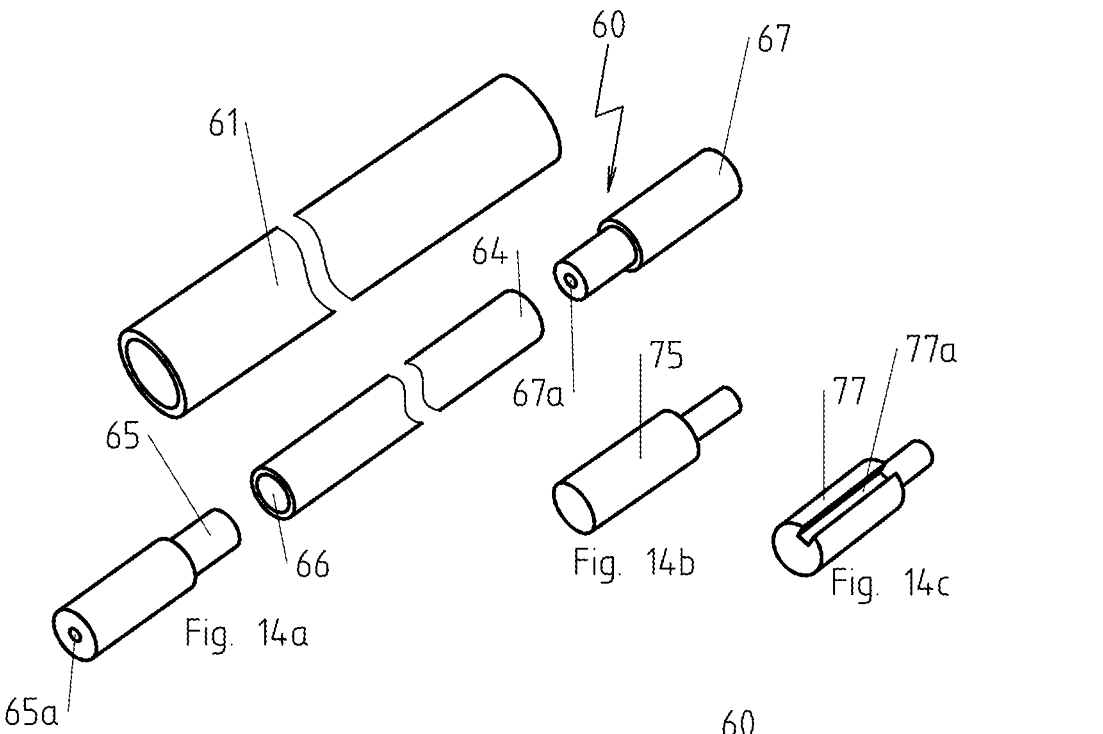
Fig. 14a
Fig. 14b
Fig. 14c
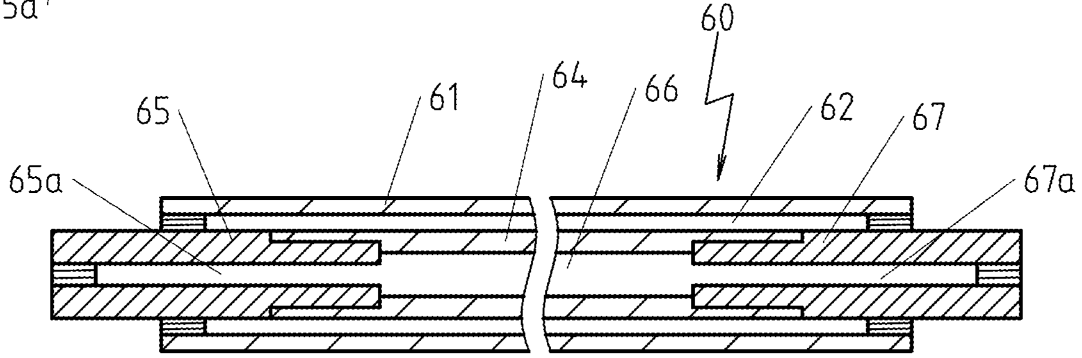
Fig. 15a
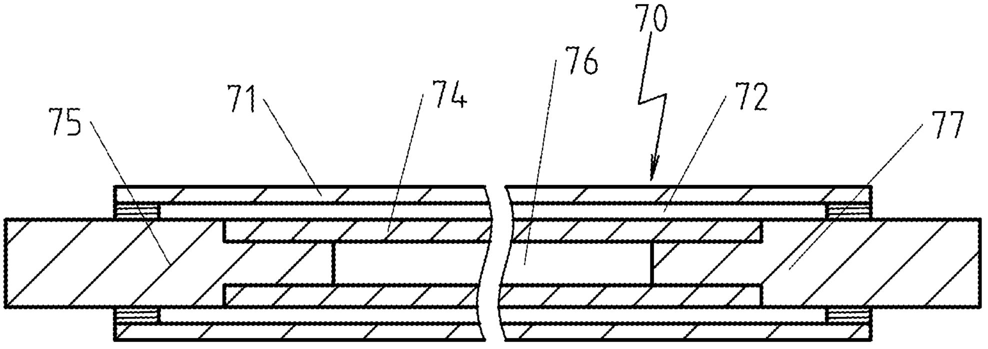
Fig. 15b

ELECTRIC TUBULAR HEATING ELEMENT AND RELATED METHOD

CROSS-REFERENCE TO RELATED APPLICATION

This application claims priority under 35 U.S.C. § 119 to German Patent Application No. 10 2019 127 692.6, filed on Oct. 15, 2019, the disclosure of which is incorporated herein by reference in its entirety.

BACKGROUND OF THE INVENTION

The invention relates to an electrical tubular heating element with the features of the preamble of the claims and as described herein and to a method to manufacture this heating element, as is also described herein.

Electrical tubular heating elements are a variant of electrical heating devices that have been known for many years. They are distinguished in that the electrical heating element is arranged within a tubular metal sheath, wherein it is electrically insulated in the radial direction relative to the tubular metal sheath by being embedded in an electrically insulating, but good heat-conducting material, in many cases, e.g., magnesium oxide, in order to prevent undesired short circuiting.

Especially in applications in which the available packaging space is only very small and must be operated with relatively low voltages, e.g., a 12-V or 48-V on-board electrical system of a passenger car, which means that high currents must flow in order to produce the desired heating output, the question is always how the small resistance and thus large wire cross section is to be realized in such a small space so that it also withstands thermal load cycling over a long period of time and how a connection to a narrow cross section between an unheated zone and a heated zone can be guaranteed in a process-assured way for such large current loads.

BRIEF SUMMARY OF THE INVENTION

This task is achieved by an electrical tubular heating element with the features of the claimed and described electrical tubular heating element and a method for manufacturing such an electrical tubular heating element with the features of the electrical tubular heating element described and claimed herein. Advantageous refinements of the invention are the subject matter of the respective dependent claims and the features described herein.

The term "electrical tubular heating element" is used broadly in this patent description and also includes, in particular, heating cartridges.

The electrical tubular heating element according to the invention has a tubular metal sheath, in whose interior an electrical heating element is arranged, which is formed from a resistive wire and is electrically insulated from the tubular metal sheath at least in sections by an electrically insulating material. It is essential to the invention that the resistive wire, from which the electrical heating element is formed, is penetrated by at least one opening and/or has a contoured peripheral surface.

Very generally, a resistive wire, from which an electrical heating element is formed, described as a general cylinder in the mathematical sense is produced by the projection of a closed flat curve that defines the cross section of the cylinder. Typically, but not necessarily, this closed flat curve is a circle, and the projection is realized on a straight line and perpendicular to the plane when the resistive wire is elongated.

An opening penetrating the resistive wire, from which the electrical heating element is formed extends from one position on one side of the resistive wire through the resistive wire to another side of the resistive wire. It does not, however, necessarily have to run through the center of a cross section of the resistive wire, but instead can also run or be arranged asymmetrically, e.g., offset to one side relative to its center or center axis, so that it can enclose an edge area, that is, change the cross-sectional contour of the resistive wire.

A resistive wire has a contoured peripheral surface in the sense of this description, if its cross-sectional surface area is locally reduced, wherein this reduction preferably starts from the outer edge of the cross-sectional surface area for the contoured peripheral surface. It can be constructed as a ring-shaped groove or local recess extending in the profile direction of the resistive wire or also formed by a continuous contour, for example, a groove extending in a spiral shape along the outer surface of the resistive wire.

Even if it is naturally not important for a device claim how a given structure was formed in the electrical heating conductor, for the sake of completeness it should be emphasized that such contoured peripheral surfaces can be generated, in particular, with metal-cutting processing techniques, but also by punching, laser processing—especially preferably fine laser cutting—or machining by means of water jet cutting—especially preferably by fine water jet cutting. They can also be generated, however, as a function of the actual desired geometry in some embodiments just like an opening that is arranged so that it encloses an edge area, that is, changes the cross-sectional contour, also by a global shaping of the heating conductor, in particular, by rolling up, folding, or bending along a longitudinal axis or the direction of extent of the heating conductor (preferably while elongated).

Through the provision of such an opening and/or a contoured peripheral surface, a series of the problems specified above can be solved. Depending on the actual construction, it can decisively contribute to the fact that the electrical heating element can better withstand mechanical loads during thermal load cycling, the available contact surface for manufacturing the electrical connection is increased and therefore the relevance of local transfer resistances is reduced and/or a given cross-sectional surface is realized with a larger surface area, which can noticeably contribute to reducing the surface load of the electrical heating element.

It is also to be noted that such a surface modification can be realized—optionally expanded by additional measures—so that a local adaptation of the heating output is created in one section of the electrical heating element and thus the electrical tubular heating element, for example, if a copper tube is pressed into the area of a ring-shaped groove formed in the resistive wire, which is then associated with a local reduction of the incident heat in this area, while the corresponding configuration with only the ring-shaped groove would produce a local increase of the incident heat in this area.

The electrical tubular heating element, especially the electrically insulating material, can be preferably compacted at least in sections.

For stability and a long service life of the electrical tubular heating element, it is advantageous if the openings penetrating the electrical heating element are filled with electrically insulating material. A material that is well suited for many applications is magnesium oxide.

It is especially preferred if the opening penetrates the electrical heating element along the length, so that the electrical heating element has the shape of a tube. This is the case, in particular, if the cross section of the opening is smaller than the cross section of the electrical heating element and overlaps completely with the electrical heating element.

In particular, if the cross section of the opening projects over the cross section of the electrical heating element in exactly one position before the opening is produced, by producing the opening a tube with a side wall that is continuously open in the direction of extent will be generated. This can be useful, for example, to prepare an electrical heating element with a given cross section (namely that of the heating element blank before forming the opening minus the cross section of the opening), but allocating to this cross section, which is relevant for the incident heating output, a larger surface area and thus reducing the load on it.

However, it is also possible that the cross section of the opening projects over the cross section of the electrical heating element at more than more position before the opening is produced, so that producing the opening divides the electrical heating element into multiple segments.

The plurality of configurations or properties that can be achieved for the electrical heating element is increased even more in that the resistive wire, from which the electrical heating element is formed, is penetrated by at least one second opening, and indeed in a different direction than that in which the first opening penetrates the electrical heating element. On one hand, such a second opening can contribute to the fact that the filling of the openings with electrically insulating material is made easier. It can also be used differently, especially, e.g., to create an option for improved absorption of mechanical loads during load cycling.

Another preferred construction of the second opening consists in that this is formed in a tubular resistive wire at least in sections with a helical-line-shape continuous in the tube wall of this tubular resistive wire. In this way, length changes in the electrical heating element due to thermal conditions can be withstood in an especially good way.

At least after the filling of openings in the electrical heating element, the opening can be closed completely or at least partially by a connecting wire or connecting pin, which is in electrical contact to the electrical heating element. In this way, an electrical connection can be prepared that simultaneously defines an essentially unheated section of the electrical tubular heating element. For this purpose, in particular, a turned part made from copper can be used in an especially advantageous way.

If the connecting wire or connecting pin has an opening, by means of which there is a connection to the opening in the electrical heating element when the opening in the connecting wire or connecting pin is open, the filling of the opening can also be realized after manufacturing the electrical connection between the electrical heating element and the connecting wire or connecting pin and especially by in-filling, which can be performed outside of the tubular metal sheath. Then, for manufacturing the electrical connection, a wire can be arranged within the opening in the connecting wire or connecting pin and this can be preferably sealed.

The method for manufacturing such an electrical tubular heating element according to the invention comprises the steps forming at least one opening penetrating a resistive wire in a resistive wire and/or contouring the peripheral surface of a resistive wire in order to prepare an electrical heating element, arranging the electrical heating element in the interior of a tubular metal sheath, electrically insulating at least sections of the electrical heating element relative to the outer sheath.

Differently than before, the resistive wire is shaped not only locally, especially along its direction of extent in a different direction for generating a desired path curve or space curve, for example, coiled or, for example, deformed in its cross section in the state installed in the heating system for a compacting step in the course of the manufacturing process of an electrical heating system, but instead it is machined such that material was removed either at least locally or such that a global shaping was performed, in particular, e.g., by rolling up, folding, or bending along a longitudinal axis or the direction of extent of the heating conductor or a heating conductor blank (preferably while it is elongated) or an axis running parallel to this direction.

It is especially preferred if at least one opening penetrating the resistive wire is filled with an electrically insulating material.

According to one preferred refinement of the method, after preparing the electrical heating element, the opening penetrating the resistive wire is filled with an electrically insulating material by pushing a bar made from the electrically insulating material into the opening. The material can be, for example, magnesium oxide. This procedure makes it especially simple to fill the opening; it is also possible, however, to fill the opening with an insulating powder or granulate, so that this can be, e.g., poured in and preferably compacted.

In one refinement of the method, by connecting the electrical heating element with at least one connecting wire or connecting pin, at least one unheated area of the electrical tubular heating element is generated. This connection can also take place on the end side, which makes it possible for the installation space requirements to be defined just through the necessary dimensions of the electrical heating element when the outer diameters are adapted to each other in the electrical heating element and connecting wire or connecting pin.

If the bar made from electrically insulating material is inserted into a continuous or blind-hole-like opening in the connecting wire or connecting pin, whose cross section is adapted to the cross section of the opening formed in the resistive wire, up to the opposing end sides of the connecting wire or connecting pin and the electrical heating element contact each other, an assembly is produced that can be very easily handled, in which also, in particular, the presence of a good electrical contact can be verified and/or ensured between the connecting wire or connecting pin on one side and electrical heating element on the other side, for example, by welding or soldering.

Briefly stated, a preferred method for manufacturing an electrical tubular heating element (10, 20, 30, 40, 50, 60, 70, 80, 90) includes the steps of inserting at least one opening (16, 26, 36, 46, 56, 66, 76, 86, 96) penetrating a resistive wire into a resistive wire and/or contouring the peripheral surface of a resistive wire (110, 120, 130, 140) in order to prepare an electrical heating element (14, 24, 34, 44, 54, 64, 74, 84, 94, 114, 124, 134, 144, 154, 164, 174, 184), arranging the electrical heating element (14, 24, 34, 44, 54, 64, 74, 84, 94, 114, 124, 134, 144, 154, 164, 174, 184) in the interior of a tubular metal sheath (11, 21, 31, 41, 51, 61, 71,

81, 91), and electrically insulating at least sections of the electrical heating element (14, 24, 34, 44, 54, 64, 74, 84, 94, 114, 124, 134, 144, 154, 164, 174, 184) relative to the tubular metal sheath (11, 21, 31, 41, 51, 61, 71, 81, 91). The method also includes at least one opening (16, 26, 36, 46, 56, 66, 76, 86, 96) penetrating the resistive wire that is filled with an electrically insulating material (12, 22, 32, 42, 52, 62, 72, 82, 92, 158, 168, 178). It is also preferred that after preparing the electrical heating element (14, 24, 34, 44, 54, 64, 74, 84, 94, 114, 124, 134, 144, 154, 164, 174, 184), the opening (16, 26, 36, 46, 56, 66, 76, 86, 96) penetrating the resistive wire is filled with an electrically insulating material by pushing a bar (158, 168, 178, 188) made from the electrically insulating material into the opening (16, 26, 36, 46, 56, 66, 76, 86, 96) penetrating the resistive wire. Further, it is preferred that by connecting the electrical heating element (14, 24, 34, 44, 54, 64, 74, 84, 94, 114, 124, 134, 154, 164, 174, 184) with at least one connecting wire or connecting pin (15, 25, 27, 35, 37, 45, 55, 57, 65, 67, 75, 77, 85, 87, 95, 97, 155, 157, 165, 167) at least one unheated area of the electrical tubular heating element (10, 20, 30, 40, 50, 60, 70, 80, 90) is generated. The method also preferably includes the bar (158, 168, 178, 188) being made from an electrically insulating material that is pushed into a continuous or blind-hole-like opening in the connecting wire or connecting pin (15, 25, 27, 35, 37, 45, 55, 57, 65, 67, 75, 77, 85, 87, 95, 97, 155, 157, 165, 167), whose cross section is adapted to the cross section of the opening (16, 26, 36, 46, 56, 66, 76, 86, 96) formed in the resistive wire, up to the opposing end sides of the connecting wire or connecting pin (15, 25, 27, 35, 37, 45, 55, 57, 65, 67, 75, 77, 85, 87, 95, 97, 155, 157, 165, 167) and the electrical heating element (14, 24, 34, 44, 54, 64, 74, 84, 94, 114, 124, 134, 144, 154, 164, 174, 184) contact each other. The method further preferably includes the step of arranging the electrical heating element (14, 24, 34, 44, 54, 64, 74, 84, 94, 114, 124, 134, 144, 154, 164, 174, 184) in the interior of a tubular metal sheath (11, 21, 31, 41, 51, 61, 71, 81, 91), the assembly (150, 160) made from the electrical heating element (14, 24, 34, 44, 54, 64, 74, 84, 94, 114, 124, 134, 144, 154, 164, 174, 184), the electrically insulating bar (158, 168, 178, 188), and connecting wires or a connecting pin (15, 25, 27, 35, 37, 45, 55, 57, 65, 67, 75, 77, 85, 87, 95, 97, 155, 157, 165, 167) is introduced into the tubular metal sheath (11, 21, 31, 41, 51, 61, 71, 81, 91).

An assembly preconfigured in this way from electrical heating element, electrically insulating bar, and connecting wires or connecting pin can then be inserted into the tubular metal sheath for arranging the electrical heating element in the interior of a tubular metal sheath, wherein, in particular, sections of the connecting wires or connecting pin can project out of the tubular metal sheath or can be connected on one side in an electrically conductive way with the tubular metal sheath.

BRIEF DESCRIPTION OF THE SEVERAL VIEWS OF THE DRAWING

The foregoing summary, as well as the following detailed description of the preferred invention, will be better understood when read in conjunction with the appended drawings. For the purpose of illustrating the preferred invention, there are shown in the drawings embodiments which are presently preferred. It should be understood, however, that the invention is not limited to the precise arrangements and instrumentalities shown. In the drawings:

FIG. 14*a* is a side perspective, partial fragmentary and partially exploded view of a fifth preferred electrical tubular heating element;

FIG. 14*b* is a side perspective view of a first variant for connecting wires or a connecting pin of the electrical tubular heating element from FIG. 14*a;*

FIG. 14*c* is a side perspective view of a second variant for connecting wires or a connecting pin of the electrical tubular heating element from FIG. 14*a,*

FIG. 15*a* is a longitudinal cross-sectional view of the electrical tubular heating element of FIG. 14*a;*

FIG. 15*b* is a longitudinal cross-sectional of the electrical tubular heating element of FIG. 14*a*, but with connecting wires or a connecting pin according to FIG. 14*b;*

DETAILED DESCRIPTION OF THE INVENTION

Figure 1B:
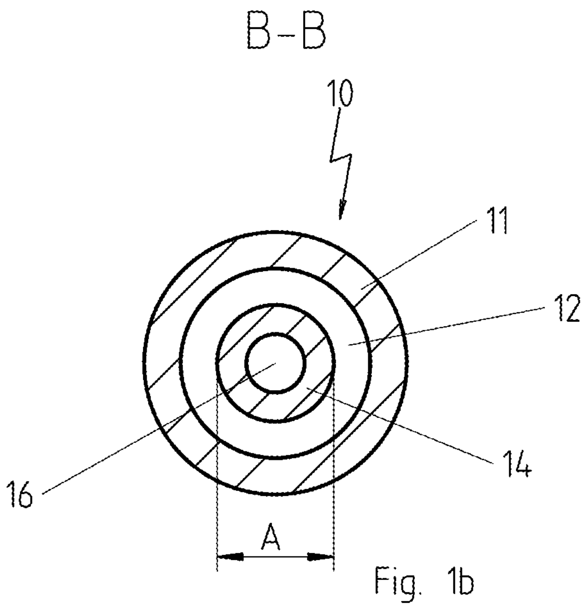
FIG. 1*b* is a cross-sectional view of the first electrical tubular heating element of FIG. 1*a*, taken along line B-B of FIG. 1*a;*
Figure 1A:
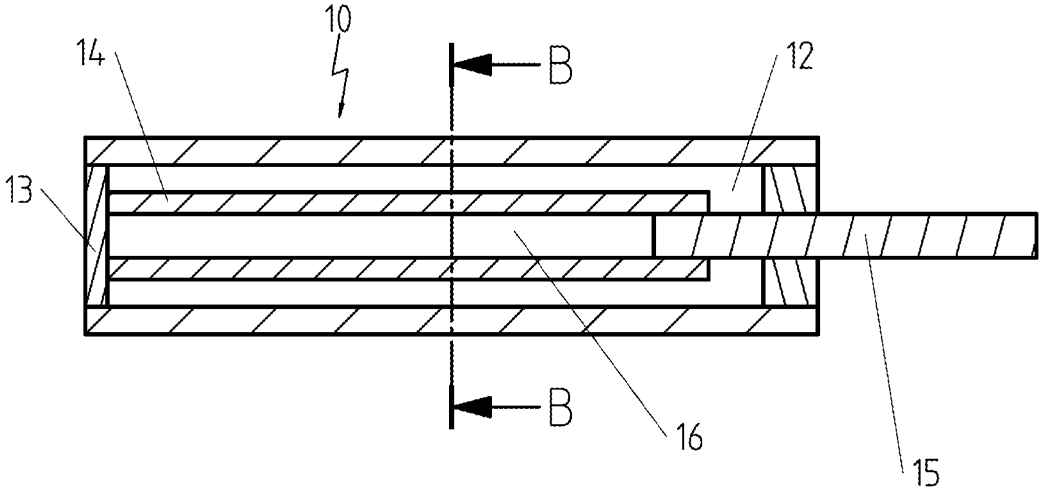
FIG. 1*a* is a longitudinal section through a first preferred electrical tubular heating element of the present invention.

FIGS. 1*a* and 1*b* show a first electrical tubular heating element 10 with tubular metal sheath 11, in whose interior an electrical heating element 14 is arranged. In this embodiment, the electrical heating element 14 is in electrical contact via the electrically conductive base plate 13 with the tubular metal sheath 11 used as a return line, but is electrically insulated from the tubular metal sheath 11 in sections—namely in its other sections—by the electrically insulating, but good heat-conducting material 12, e.g., magnesium oxide.

One special feature of the electrical heating element 14 consists in that it is not or no longer manufactured from a solid resistive wire. Instead, the resistive wire has an opening 16 penetrating it along the length from the connection-side end face to the base-side end face, so that it is tubular, wherein the opening 16 is likewise filled with electrically insulating material. This can be the same material as the electrically insulating material 12 or a different electrically insulating material.

The power supply of the electrical heating element 14 is realized by means of a solid connecting wire or connecting pin 15, which can consist, e.g., of copper. It is worth noting that the connecting wire or connecting pin 15 is inserted into the opening 16 for manufacturing the electrical contact to the electrical heating element 14, whereby the installation space requirements are minimized in the radial direction while simultaneously providing a large contact surface area.

Figure 2A:
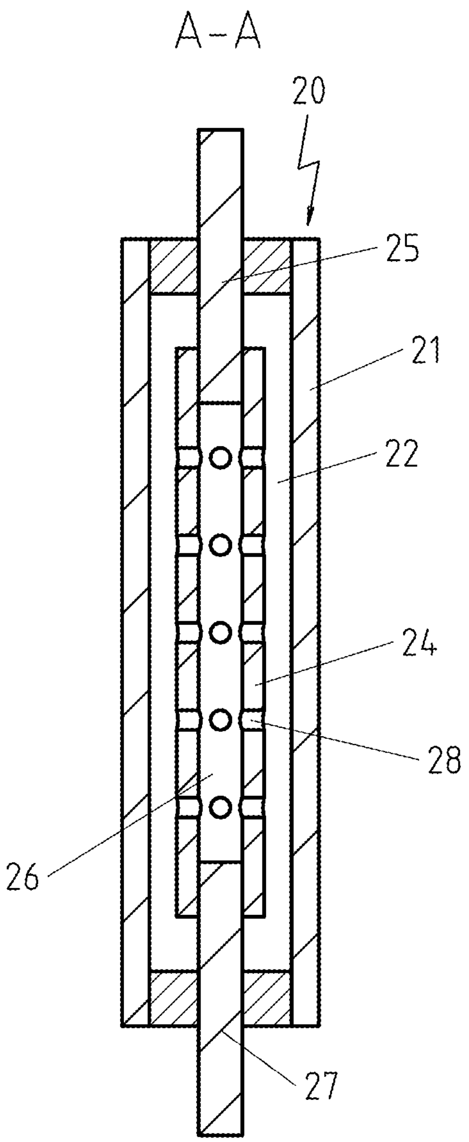
FIG. 2*a* is a longitudinal section through a second preferred electrical tubular heating element of the present invention, taken along line A-A of FIG. 2*b;*
Figure 2B:
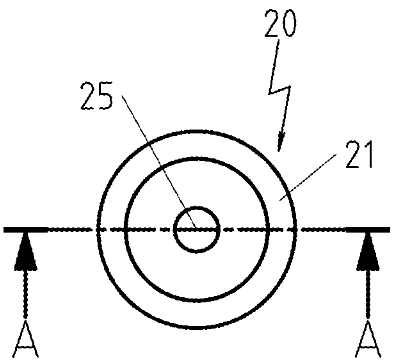
FIG. 2*b* is a front elevational view of the second electrical tubular heating element of FIG. 2*a;*

FIGS. 2*a* and 2*b* show a second electrical tubular heating element 20 with tubular metal sheath 21, in whose interior an electrical heating element 24 is arranged electrically insulated from the tubular metal sheath 21 by the electrically insulating but good heat-conducting material 22, e.g., magnesium oxide.

The electrical heating element 24 is also not or no longer manufactured from a solid resistive wire. In addition to the opening 26 penetrating it along its length from a connection-side end face to the opposite connection-side end face, it has a plurality of additional openings 28, each of which penetrates it in the radial direction. In this way, on one hand, a local additional increase in resistance is created, but the filling of the opening 16 with electrically insulating material is also made easier, when this is filled in a flowable state.

The power for the electrical heating element 24 is supplied analogous to the embodiment described above by means of a massive connecting wire or connecting pin 25, which can consist of, e.g., copper; because here, however, the tubular metal sheath 21 is not used as a return line, a second, identically configured connecting wire or connecting pin 27 is present on the opposite side of the electrical heating element 24.

Figure 3A:
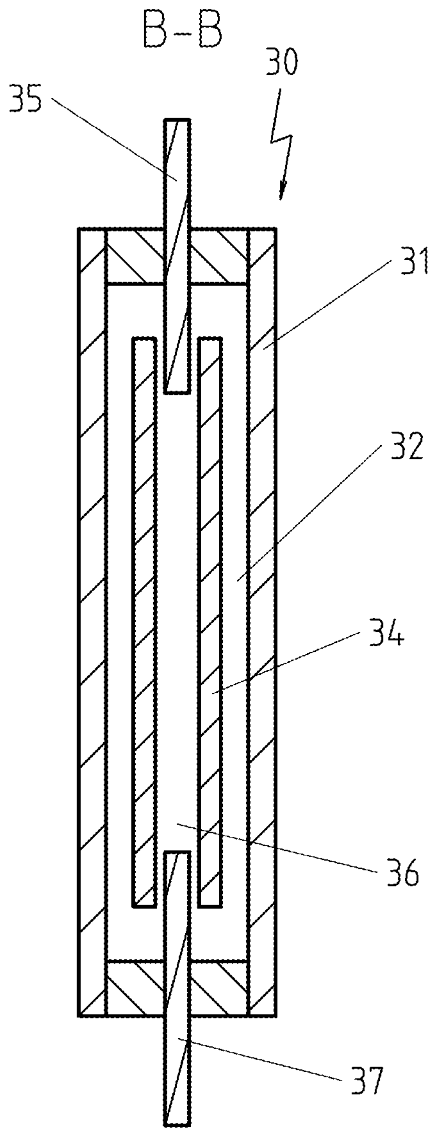
FIG. 3*a* is a longitudinal section through a third preferred electrical tubular heating element of the present invention, taken along line B-B of FIG. 3*b;*
Figure 3B:
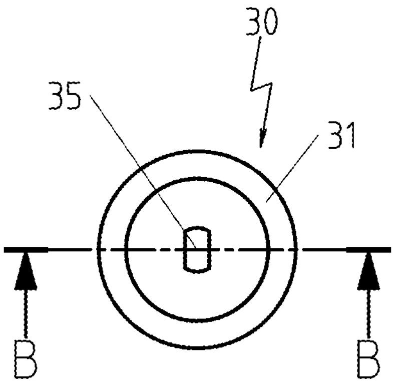
FIG. 3*b* is front elevational view of the third electrical tubular heating element from FIG. 3*a;*

FIGS. 3*a* and 3*b* show a third electrical tubular heating element 30 with tubular metal sheath 31, in whose interior an electrical heating element 34 is arranged electrically insulated from the tubular metal sheath 31 by the electrically insulating, but good heat-conducting material 32, e.g., magnesium oxide.

The electrical heating element 34 is also not or no longer manufactured from a solid resistive wire. Here, the resistive wire is penetrated along the length from one connection-side end face to the opposite connection-side end face by an opening 36, which has a central, circular cross-sectional area arranged coaxial to the resistive wire, so that a tube remains after the central cross-sectional area is formed.

To supply this structure of the electrical heating element 34 with power, here, as can be seen especially well in consideration of FIG. 3*b*, two-sided connecting wires or connecting pins 35, 37 are used, which have essentially a rectangular cross section, wherein the electrical contact to the electrical heating element 34 is manufactured via the narrow sides of the rectangle. In this way, which can also be transferred to other embodiments of the electrical heating element, an opening remains on the end side, through which the electrically insulating material can be easily inserted into the openings in the electrical heating element.

Figure 4A:
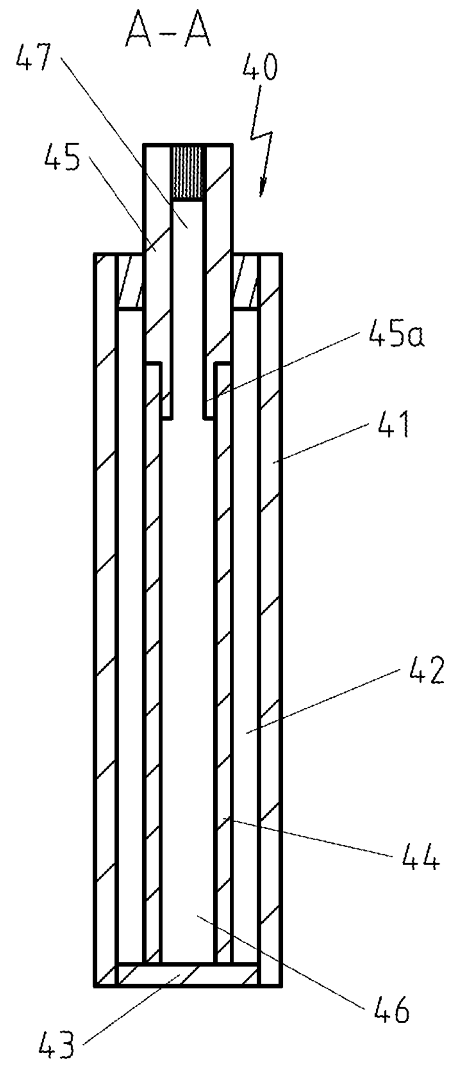
FIG. 4*a* is a longitudinal section through a fourth preferred electrical tubular heating element of the present invention, taken along line A-A of FIG. 4*b;*
Figure 4B:
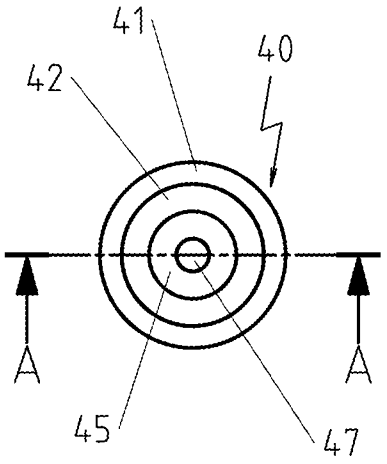
FIG. 4*b* is a front elevational view of the fourth electrical tubular heating element from FIG. 4*a;*

The electrical tubular heating element 40 shown in FIGS. 4*a* and 4*b* with tubular metal sheath 41, electrically insulating material 42, base 43, electrical heating element 44 with opening 46 and connecting wire or connecting pin 45 is constructed essentially analogous to the electrical tubular heating element 10 described above with reference to FIGS. 1*a* and 1*b*, which is why the description of these figures can be referenced, wherein the reference symbols specified above are produced by adding thirty to the corresponding reference symbols of FIGS. 1*a* and 1*b*.

The essential difference is that here the connecting wire or connecting pin 45 is constructed as a turned part made from copper, which is penetrated by the opening 47 in order to simplify the insertion of electrically insulating material 42 into the opening 46. The connecting wire or connecting pin 45 engages in the opening 46 only with one end section 45*a*, in which its cross section is reduced; its outer diameter is adapted to the outer diameter of the electrical heating element 44.

The description of the previous embodiments may show that the insertion of electrically insulating material into the opening formed in the resistive wire that forms the electrical heating element is not easily realized with process assurance. This problem can be solved if an assembly is preconfigured as shown in FIGS. 5*a* to 5*c* before the electrical heating element is inserted into the interior of the tubular metal sheath.

Figures 5A, 5B, 5C, 6A, 6B, 7A, 7B, 8A, 8B:
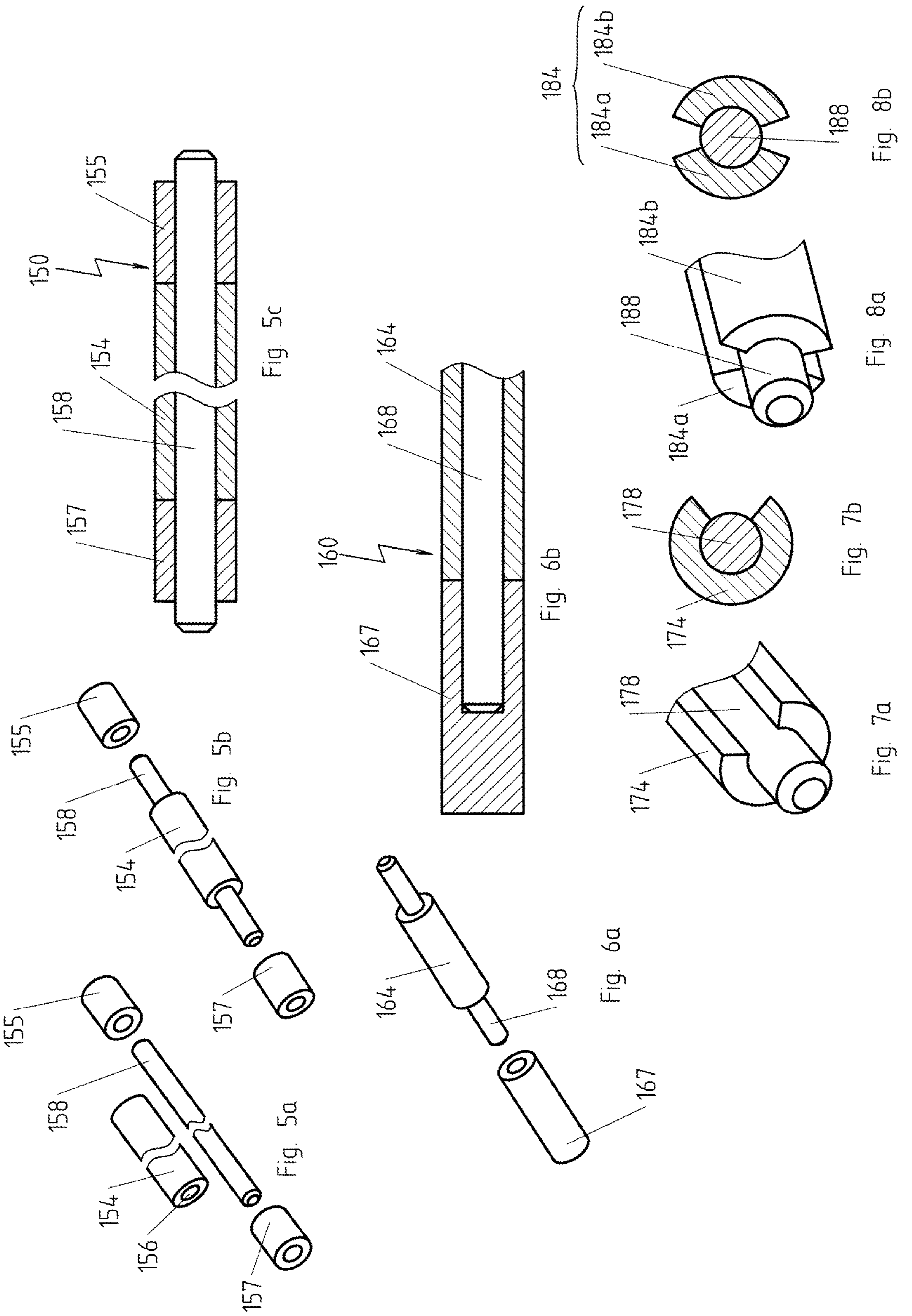
FIG. 5*a* is a side perspective, partial fragmentary and exploded view of components of an assembly for manufacturing an electrical tubular heating element in accordance with a preferred embodiment of the present invention.
FIG. 5*b* is a side perspective, partial fragmentary and partially exploded view of an intermediate stage for joining the assembly of components from FIG. 5*a;*
FIG. 5*c* is a cross-sectional, side elevational, partial fragmentary view of the joined assembly from FIG. 5*a;*
FIG. 6*a* is a side perspective and partially exploded view of a variant of an assembly for manufacturing an electrical tubular heating element in the intermediate stage analogous to the assembly of the intermediate joining stage of the assembly of components of FIG. 5*b;*
FIG. 6*b* is a cross-sectional, partial fragmentary view of an end section of the joined assembly of FIG. 6*a;*
FIG. 7*a* is a side perspective, partial fragmentary view of another variant of a preferred electrical heating element.
FIG. 7*b* is a cross-sectional view of the variant from FIG. 7*a*, taken generally perpendicular to a longitudinal axis of the electrical heating element of FIG. 7*a* or parallel to a lateral axis.
FIG. 8*a* is a side perspective, partial fragmentary view of another variant of a preferred electrical heating element.
FIG. 8*b* is a cross-sectional view of the variant from FIG. 8*a*, taken generally perpendicular to a longitudinal axis of the electrical heating element of FIG. 8*a* or parallel to a lateral axis.

FIG. 5*a* shows the components of the assembly 150, namely the electrical heating element 154, which has a tubular construction with an opening 56 penetrating the resistive wire from which the electrical heating element 154 is formed from one end side to the other end side, a bar 158 made from electrically insulating, good heat-conducting material, which can consist of, e.g., magnesium oxide and whose outer diameter is adapted to the cross section of the opening 56, and also two tubular connecting wires or connecting pins 155, 157 made from electrically good conductive material, e.g., nickel or copper, which are each penetrated from one end side to the other end side by an opening, whose cross section is adapted to the cross section of the opening 56 of the electrical heating element 154.

The electrical heating element 154 can be simply threaded onto the bar 158, as shown in FIG. 5*b* and then the assembly 150, which is shown complete in FIG. 5*c*, is finished by threading the connecting pins 155, 157 from different sides onto the bar 158 and bringing them into end-side surface-area contact with the electrical heating element 154. This can also be secured, for example, by soldering or welding.

The assembly 150 then must still be positioned in the interior of the tubular metal sheath, insulated from it by being surrounded with electrically insulating material and optionally compacted, in order to manufacture the electrical tubular heating element.

FIGS. 6*a* and 6*b* show how this procedure could be transferred advantageously to an electrical tubular heating element, whose tubular metal sheath forms the return line. The connecting wire or connecting pin 157 from FIGS. 5*a* to 5*c* is replaced by a connecting wire or connecting pin 167 with a blind hole, whose cross section is adapted to the cross section of the bar 168, the bar 168 is inserted with electrical heating element 164 arranged thereon into the blind hole and the end-side electrical contact between the connecting wire or connecting pin 167 and electrical heating element 164 is manufactured.

FIGS. 7*a* and 7*b* and also 8*a* and 8*b* show that the openings formed in the electrical heating element can also disconnect this element, like for the electrical heating element 174, in which the tube has a continuously opened side wall in the direction of extent, or separate it, like for the electrical heating element 184 assembled from segments 184*a* and 184*b*. The embodiment according to FIGS. 7*a*, 7*b* can also be realized by rolling up a (flat) band section-shaped heating element blank.

In the embodiment that is shown in FIGS. 8*a* and 8*b*, in contrast, the resistive wire, which forms the electrical heating element 184, is penetrated along its length from one connection-side end face to the opposite connection-side end face by an opening that has, in addition to a central, circular cross-sectional area arranged coaxial to the resistive wire with smaller diameter than the diameter of the resistive wire, two opposing, circular ring sector-shaped cross-sectional areas, which separate the tube remaining after the formation of the central cross-sectional area along the length into the two half-shell-shaped segments 184*a*, 184*b*. This makes the insertion of electrically insulating material especially easy and leads to further desired increase in resistance. For contacting or pre-configuration of an assembly, e.g., an electrical weld contact to the narrow sides of a connecting pin with rectangular cross section, as shown in FIGS. 3*a* and 3*b* can be manufactured.

While the electrical heating element 174 pushed on a bar 178 still forms a stable arrangement, for the configuration of an assembly, the segments 184*a* and 184*b* are held by manufacturing a mechanically supportive contact to the not-shown connecting wire or connecting pin.

FIGS. 9*a*, 9*b*, 10*a*, 10*b*, 11 and 12 show electrical heating elements 114, 124, 134, 144, in which a local adaptation of the resistance is realized—partially as an addition—such that a contoured surface 110, 120, 130, 140 is formed in the resistive wire, which forms the electrical heating element. For the electrical heating element 114 shown in FIGS. 9*a* and 9*b*, two grooves 118 are milled in order to form the contoured surface 110, whereby a local increase in resistance is created.

Figure 10B:
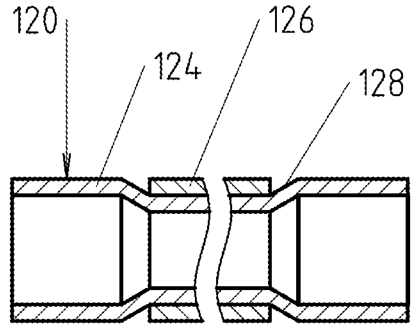
FIG. 10*b* is a longitudinal cross-sectional view of the electrical heating element of FIG. 10*a*, taken through the electrical heating element of FIG. 10*a*, generally parallel to a longitudinal axis of the electrical heating element.
Figure 10A:
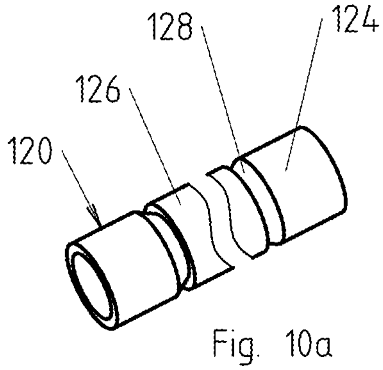
FIG. 10*a* is a side perspective, partial fragmentary view of a second example of an electrical heating element with contoured peripheral surface.

For the electrical heating element 124 shown in FIGS. 10*a* and 10*b*, a tapering 128 is formed, in order to form the contoured surface 120. On the contoured surface 120, a tube 126 is pressed. If a good electrically conductive material, e.g., copper, is selected for the tube 126, a local reduction of the resistance can be achieved in this way.

Figure 11:
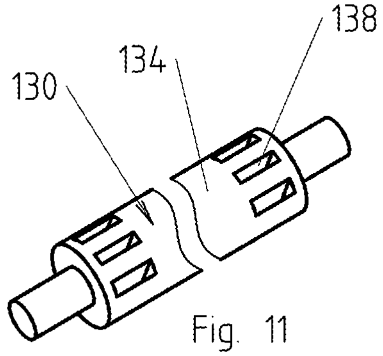
FIG. 11 is a side perspective, partial fragmentary view of a third example of an electrical heating element with contoured peripheral surface.

For the electrical heating element 134 shown in FIG. 11, the output adaptation is achieved by cut-outs in the resistive wire, which can be formed, e.g., with laser cutting, especially fine laser cutting, punching or water-jet cutting, especially fine water jet cutting, in order to form the contoured surface 130.

Figure 12:
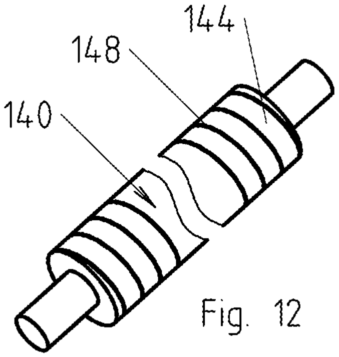
FIG. 12 is a side perspective, partial fragmentary view of a fourth example of an electrical heating element with contoured peripheral surface.
Figure 9B:
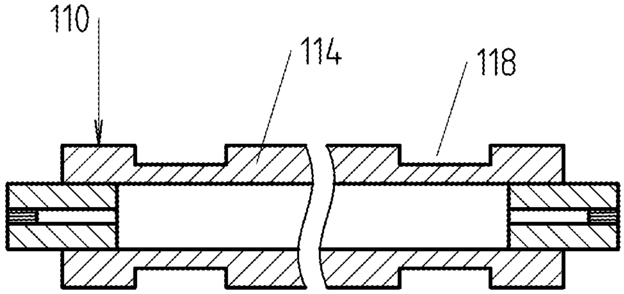
FIG. 9*b* a longitudinal cross-sectional view of the electrical heating element of FIG. 9*a*, taken through the electrical heating element of FIG. 9*a*, generally parallel to a longitudinal axis of the electrical heating element.
Figure 9A:
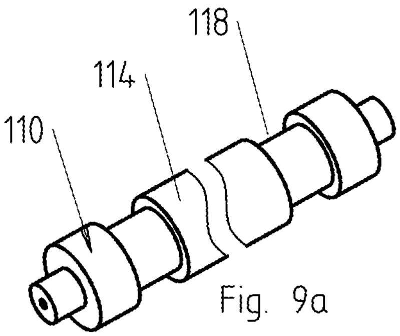
FIG. 9*a* is a side perspective, partial fragmentary view of a first example of an electrical heating element with contoured peripheral surface.

For the electrical heating element 144 according to FIG. 12, a helical line 148 is formed with a laser in the surface of the resistive wire, in order to form the contoured surface 140.

Figure 13:
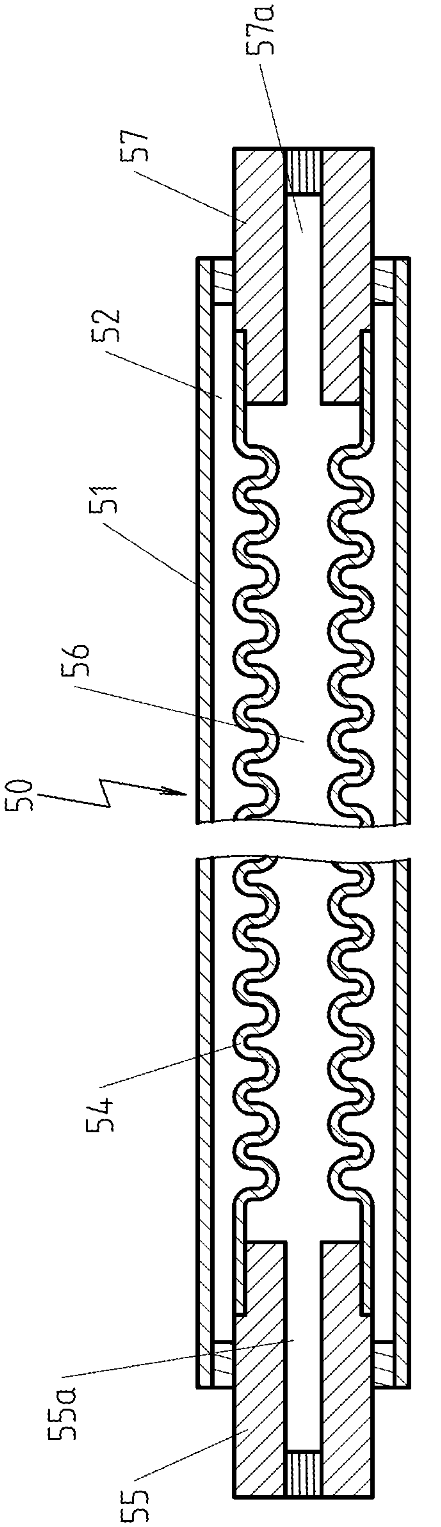
FIG. 13 is a longitudinal cross-sectional view of a fifth example of an electrical heating element with contoured peripheral surface.

The electrical tubular heating element 50 shown in FIG. 13 with tubular metal sheath 51, electrically insulating material 52, electrical heating element 54 with opening 56 and connecting wires or connecting pins 55, 57 with openings 55*a*, 57*a* penetrating the connecting pin 55, 57 differs from the electrical tubular heating element 40 shown in FIGS. 4*a* and 4*b* not only in that it is designed for a two-sided electrical connection and consequently does not use the tubular metal sheath 51 as a return line, but instead primarily in that the electrical heating element 54 with opening 56 penetrating it along its length has a contoured peripheral surface, which is here realized such that a corrugated-tube-like construction was given to the resistive wire. Through this measure, an electrical heating element can compensate for length changes during temperature cycling in a considerably better way than is the case for elongated electrical heating elements.

Two additional embodiments of electrical tubular heating elements 60, 70 will now be shown with reference to FIGS. 14*a*, 14*b*, 14*c*, 15*a* and 15*b*.

FIG. 14*a* shows an exploded view (in which, however, the electrically insulating material 62 is not shown) of an electrical tubular heating element 60 and FIG. 15*a* shows a longitudinal section through this electrical tubular heating element 60. The construction of the electrical tubular heating element 60 with tubular metal sheath 61, electrically insulating material 62, electrical heating element 64 with opening 66 and connecting wires or connecting pins 65, 67 with openings 65*a*, 67*a* penetrating the connecting pins 65, 67 is essentially identical to that of the electrical tubular heating element 50 from FIG. 13 with the difference that here the electrical heating element 64 is a tubular resistive wire that is preferably self-supporting, i.e., it does not deform under its own weight. This embodiment shows, in particular, that an assembly made from connecting wires or connecting pins 65, 67 and electrical heating element 64 can then also be preconfigured and inserted into the interior of the tubular metal sheath 61, if it is decided not to use a bar made from electrically insulating material, as was explained above, for example, in connection with FIGS. 5*a* and 5*b*.

FIGS. 14*b* and 14*c* each show variants of connecting wires or connecting pins 75, 77, which can be used as alternatives to the connecting wires or connecting pins 65, 67. FIG. 15*b* shows an electrical tubular heating element 70 with such connecting pins 75, 77. Otherwise, the construction of the electrical tubular heating element 70 with tubular metal sheath 71, electrically insulating material 72, electrical heating element 74 with opening 76 and connecting wires or connecting pins 75, 77 is essentially identical to that of the electrical tubular heating element 60 from FIG. 15*a*.

Figures 16A, 16C:
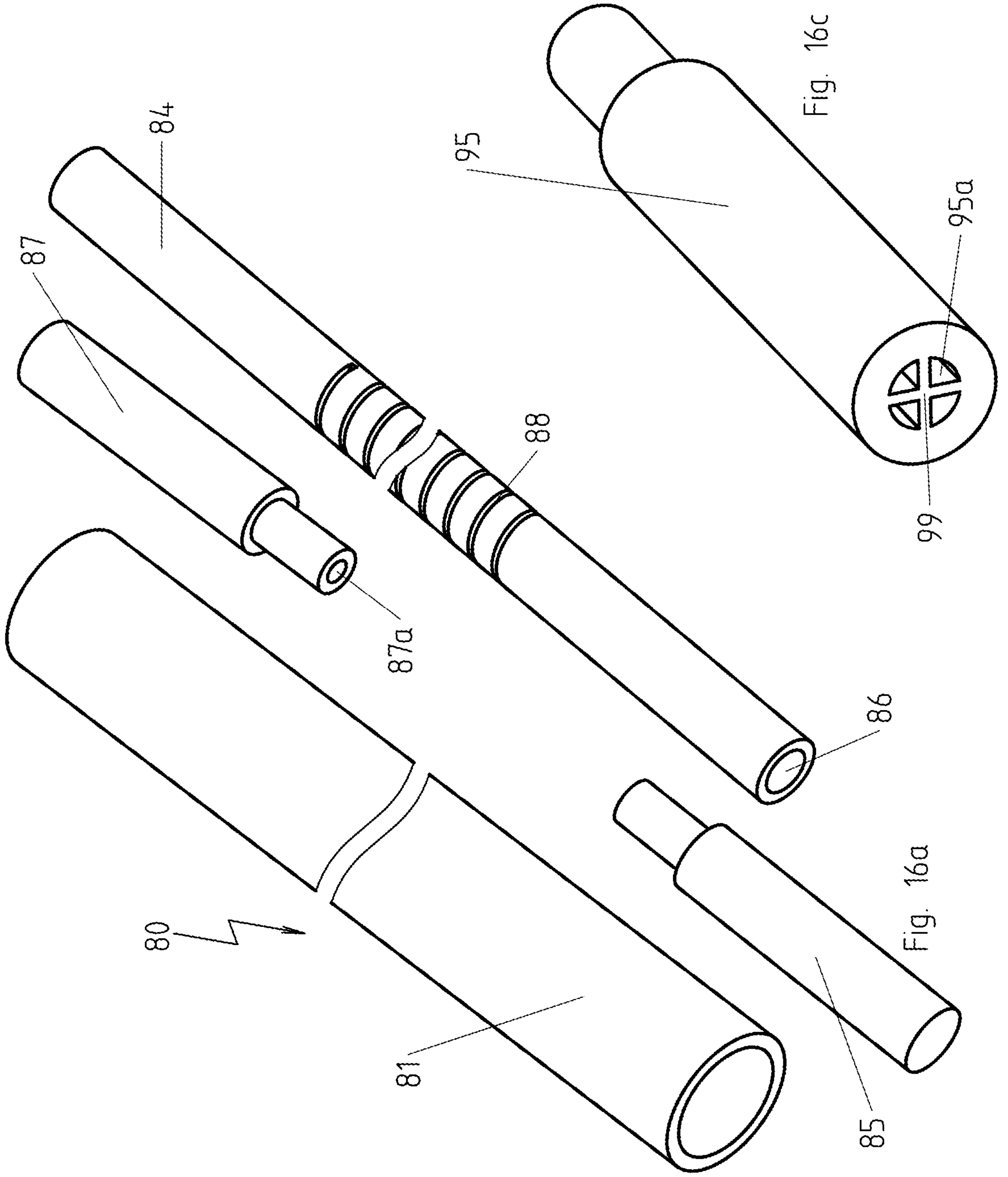
FIG. 16*a* is a side perspective, exploded and partial fragmentary view of a sixth preferred electrical tubular heating element of the present invention.
FIG. 16*c* is a side perspective view of a variant for connecting wires or a connecting pin of the electrical tubular heating element of FIG. 16*a;*
Figures 16B, 16D:
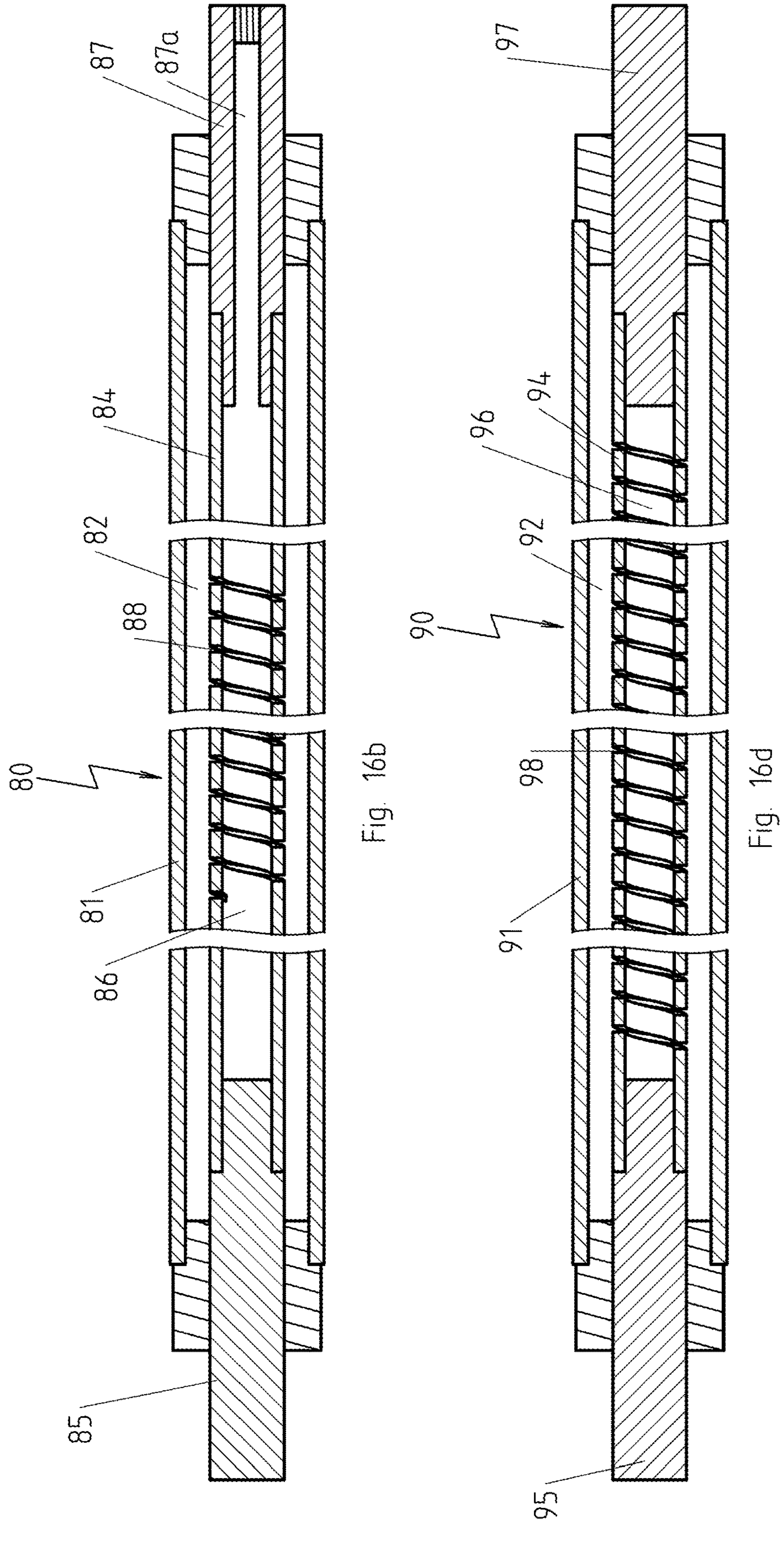
FIG. 16*b* is a longitudinal cross-sectional view of the electrical tubular heating element of FIG. 16*a*, taken generally perpendicular to a longitudinal axis of the assembled electrical tubular heating element of FIG. 16*a;*
FIG. 16*d* is a longitudinal cross-sectional, partial fragmentary view of a variant of the electrical tubular heating element of FIG. 16*a* with connecting wires or a connecting pin according to FIG. 16*c;*

FIG. 16*a* shows an exploded view (in which, however, the electrically insulating material 82 is not shown) of an electrical tubular heating element 80 and FIG. 16*b* shows a longitudinal section through this electrical tubular heating element 80. The construction of the electrical tubular heating element 80 with tubular metal sheath 81, electrically insulating material 82, electrical heating element 84 with opening 86 and connecting wires or connecting pins 85, 87 with opening 87*a* penetrating the connecting pin 85, 87 is similar to that of the electrical tubular heating element 60 from FIGS. 14*a* and 15*a*.

Figure 16F:
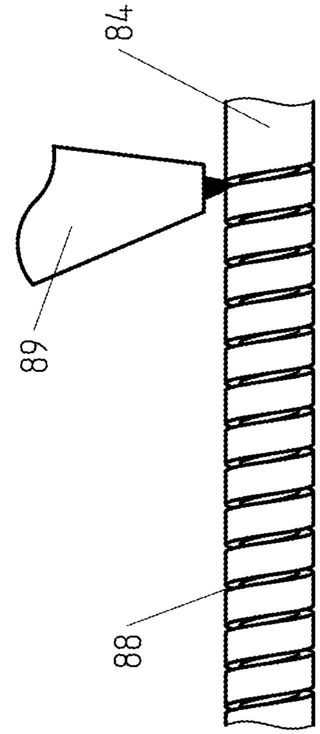
FIG. 16*f* is a side elevational, schematic view of a manufacturing process for an electrical heating element, as the electrical heating element is used in FIG. 16*a;*

One very important difference, however, consists in that here the electrical heating element 84 is a tubular resistive wire that is preferably self-supporting, i.e., does not deform under its own weight, in which a helical-line-shaped groove 88 was also cut. In addition to a local modification of resistance, in this way a possibility for compensating length changes due to temperature cycling is prepared that can be realized more easily especially for small designs than the embodiment according to FIG. 13. As shown schematically in FIG. 16*f*, the helical-line-shaped groove 88 penetrating the tube wall is cut only in one tubular resistive wire, for example, with a laser 89.

Figure 16E:
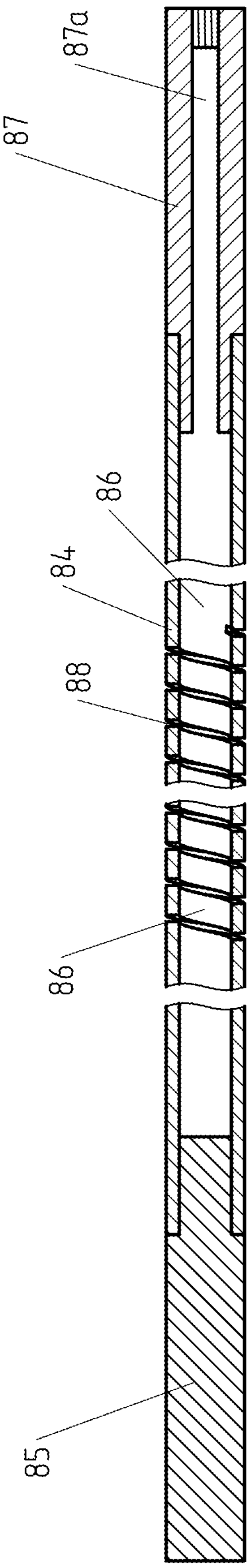
FIG. 16*e* is a longitudinal cross-sectional, partial fragmentary view of the electrical heating element assembly of FIG. 16*c;*
Figure 17A:
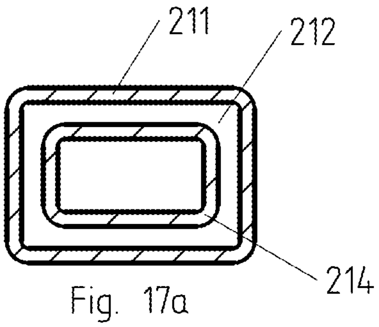
FIG. 17*a* is a lateral cross-sectional view of a first variant of an electrical tubular heating element, particularly a variant of a tubular metal sheath and an electrical heating element.
Figure 17B:
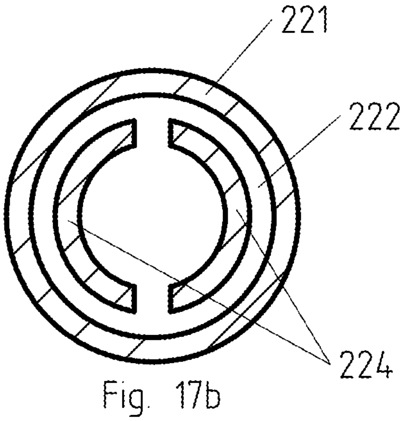
FIG. 17*b* is a lateral cross-sectional view of another first variant of an electrical tubular heating element, particularly a variant of a tubular metal sheath and an electrical heating element.
Figure 17C:
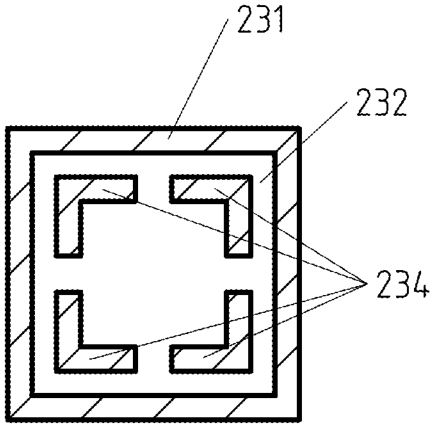
FIG. 17*c* is a lateral cross-sectional view of another first variant of an electrical tubular heating element, particularly a variant of a tubular metal sheath and an electrical heating element.
Figure 17D:
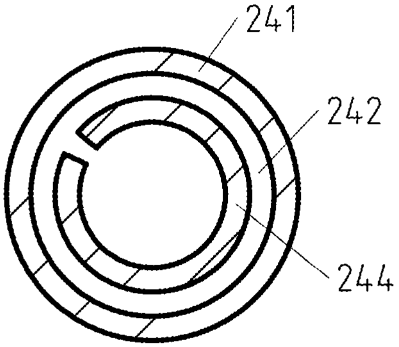
FIG. 17*d* is a lateral cross-sectional view of another first variant of an electrical tubular heating element, particularly a variant of a tubular metal sheath and an electrical heating element.
Figure 17E:
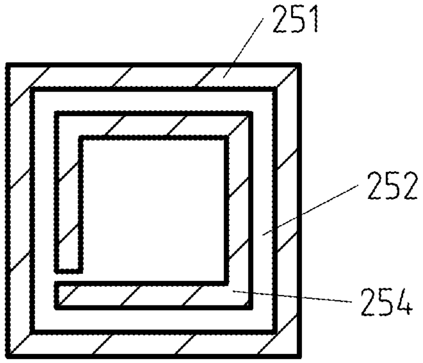
FIG. 17*e* is a lateral cross-sectional view of another a first variant of an electrical tubular heating element, particularly a variant of a tubular metal sheath and an electrical heating element.
Figure 17F:
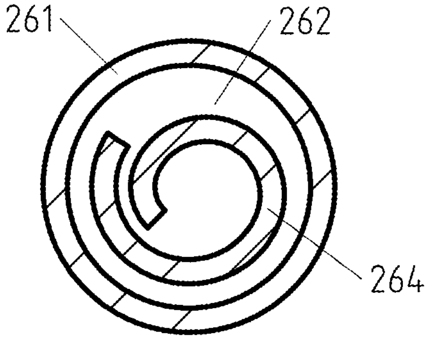
FIG. 17*f* is a lateral cross-sectional view of another first variant of an electrical tubular heating element, particularly a variant of a tubular metal sheath and an electrical heating element.
Figure 17G:
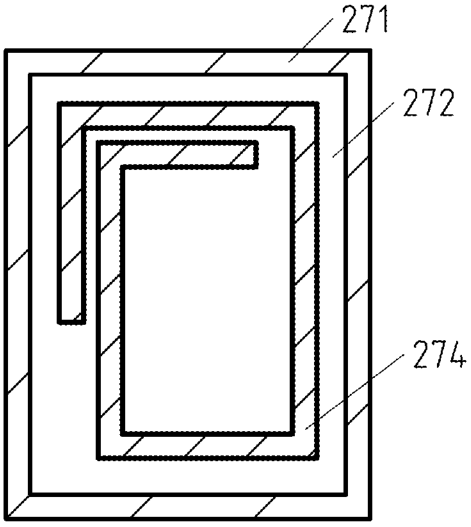
FIG. 17*g* is a lateral cross-sectional view of another first variant of an electrical tubular heating element, particularly a variant of a tubular metal sheath and an electrical heating element.

Also in this embodiment it is possible that, as shown in FIG. 16*e*, an assembly made from connecting wires or connecting pins 85, 87 and electrical heating element 84 is preconfigured and can be inserted into the interior of the tubular metal sheath 81, even if connecting pins 85, 87 and electrical heating element 84 are not supposed to be soldered or welded, but instead the electrical contact is supposed to be realized through a press-fit contact.

FIG. 16*c* shows a variant of a connecting wire or connecting pin 95, which can be used as alternatives to the connecting wires or connecting pins 85, 87. The connecting pin 95 is distinguished in that its opening 95*a* is supported from the inside by cross-shaped reinforcement ribs 99. This can make a significant contribution in preventing an undesired deformation of a contact area, especially for small designs, if a press-fit contact is supposed to be formed.

FIG. 16*d* shows an electrical tubular heating element 90 with tubular metal with such connecting pins 95, 97. Otherwise, the construction of the electrical tubular heating element 90 with tubular metal sheath 91, electrically insulating material 92, electrical heating element 94 with opening 96 and connecting wires or connecting pins 95, 97 is essentially identical to that of the electrical tubular heating element 80 from FIG. 16*b*.

FIGS. 17*a* to 17*g* show again the plurality of designed degrees of freedom with respect to shape and arrangement of tubular metal sheath 211, 221, 231, 241, 251, 261, 271 and an opening along the length, which cannot be seen in the cross-sectional views of FIGS. 17*a* to 17*e*, because it is filled with electrically insulating material 212, 222, 232, 242, 252, 262, 272, and electrical heating element (214, 224, 234, 244, 254, 264, 274), which offers the construction principle according to the invention.

First, it can be seen that the cross section of the tubular metal sheath 211, 221, 231, 241, 251, 261, 271 can be selected to be, for example, round, rectangular, square, or rectangular with rounded corners, obviously oval or elliptical cross sections can also be chosen just as well.

Second, it can be seen that according to the cross section of the opening penetrating the resistive wire along its length, by which the electrical heating element 214, 224, 234, 244, 254, 264, 274 is formed, in addition to tubular electrical heating elements 214, also segment-like electrical heating elements 224, 234, electrical heating elements with a separated tube wall 242, 252 or even with overlapping electrical heating elements 264, 274 can be formed.

Third, this group of figures shows that the shown electrical heating elements with openings can each be obtained by rolling up, bending, or folding, in particular, (flat) band section-like or plate-shaped heating element blanks, that is, by global shaping processes.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE SYMBOLS

10, 20, 30, 40, 50, 60, 70, 80, 90 Electrical tubular heating element
11, 21, 31, 41, 51, 61, 71, 81, 91 Tubular metal sheath
12, 22, 32, 42, 52, 62, 72, 82, 92 Electrically insulating material
13, 43 Base
14, 24, 34, 44, 54, 64, 74, 84, 94, 114, 124, 134, 144, 154, 164, 174, 184 Electrical heating element
15, 25, 27, 35, 37, 45, 55, 57, 65, 67, 75, 77, 85, 87, 95, 97, 155, 157, 165, 167 Connecting wire or connecting pin
16, 26, 36, 46, 56, 66, 76, 86, 96 Opening
28 Additional opening
34*a*, 34*b* Half shell
47, 55*a*, 57*a*, 65*a*, 67*a* Opening
77*a*, 118 Groove
88, 98 Helical-line-shaped groove
89 Laser
99 Cross-shaped reinforcement ribs
110, 120, 130, 140 Contoured peripheral surface
126 Ring
128 Slot
138 Recess
148 Helical line
150, 160 Assembly
158, 168, 178, 188 Bar made from electrically insulating material
184*a*, 184*b* Segment
211, 221, 231, 241, 251, 261, 271 Tubular metal sheath
212, 222, 223, 242, 252, 262, 272 Electrically insulating material
214, 224, 234, 244, 254, 264, 274 Electrical heating element

The invention claimed is:

1. An electrical tubular heating element for producing a desired heating output, the electrical tubular heating element comprising:
a tubular metal sheath having an interior; and
an electrical heating element positioned within the interior, the electrical heating element formed from a resistive rod and being electrically insulated from the tubular metal sheath at least in sections by an electrically insulating material, the resistive rod, from which the electrical heating element is formed, is penetrated by an opening, the opening passing through the electrical heating element and penetrating the electrical heating element along a length of the electrical heating element so that the electrical heating element has the shape of a tube with a side wall open continuously in a direction of extent so that the electrical heating element is divided into multiple segments.

2. The electrical tubular heating element according to claim 1, wherein the opening is comprised of a plurality of openings passing through the electrical heating element, the openings being filled with the electrically insulating material.

3. The electrical tubular heating element according to claim 1, wherein the opening is closed at least partially by a connecting pin, the connecting pin being in electrical contact with the electrical heating element.

4. The electrical tubular heating element according to claim 1, wherein the electrical heating element is arranged in the interior of the tubular metal sheath and the sections of the electrical heating element are electrically insulated from the tubular metal sheath.

5. The electrical tubular heating element according to claim 4, wherein the opening penetrating the resistive rod is filled with the electrically insulating material.

6. An electrical tubular heating element for producing a desired heating output, the electrical tubular heating element comprising:
a tubular metal sheath having an interior; and
an electrical heating element positioned within the interior, the electrical heating element formed from a resistive rod and being electrically insulated from the tubular metal sheath at least in sections by an electrically insulating material, the resistive rod, from which the electrical heating element is formed, is penetrated by a first opening and a second opening, the second opening extending in a different direction than a direction in which the first opening penetrates the resistive rod.

7. An electrical tubular heating element for producing a desired heating output, the electrical tubular heating element comprising:
a tubular metal sheath having an interior; and
an electrical heating element positioned within the interior, the electrical heating element formed from a resistive rod and being electrically insulated from the tubular metal sheath at least in sections by an electrically insulating material, the resistive rod, from which the electrical heating element is formed, is penetrated by an opening,
wherein the opening is at least partially closed by a connecting pin, the connecting pin being in electrical contact with the electrical heating element, and
wherein the opening in the electrical heating element is a first opening, and the connecting pin has a second opening in communication with the first opening, thereby providing access to the first opening via the second opening.

8. The electrical tubular heating element according to claim 7, wherein a rod is arranged within and closed the second opening.

9. An electrical tubular heating element for producing a desired heating output, the electrical tubular heating element comprising:
a tubular metal sheath having an interior; and
an electrical heating element positioned within the interior, the electrical heating element formed from a resistive rod and being electrically insulated from the tubular metal sheath at least in sections by an electrically insulating material, the resistive rod, from which the electrical heating element is formed, is penetrated by an opening,
wherein the opening penetrating the resistive rod is filled with the electrically insulating material,
wherein the electrical heating element is arranged in the interior of the tubular metal sheath and the sections of the electrical heating element are electrically insulated from the tubular metal sheath, and
wherein, after the electrical heating element is prepared, the opening is filled with the electrically insulating material by pushing a bar constructed of the electrically insulating material into the opening.

10. The electrical tubular heating element according to claim 9, wherein by connecting the electrical heating element with a connecting pin an unheated area of the electrical tubular heating element is generated.

11. The electrical tubular heating element according to claim 9, wherein the bar is pushed into one of a continuous and a blind-hole-like opening in the connecting pin, a cross section of the bar is adapted to a cross section of the opening formed in the resistive rod, up to opposing end sides of the connecting pin, the connecting pin and the electrical heating element contacting each other.

12. The electrical tubular heating element according to claim 11, wherein arranging the electrical heating element in the interior of the tubular metal sheath includes an assembly constructed of the electrical heating element, the bar, and the connecting pin introduced into the tubular metal sheath.

13. An electrical tubular heating element for producing a desired heating output, the electrical tubular heating element comprising:

a tubular metal sheath having an interior; and an electrical heating element positioned within the interior, the electrical heating element formed from a resistive rod and being electrically insulated from the tubular metal sheath at least in sections by an electrically insulating material, the resistive rod, from which the electrical heating element is formed, is penetrated by at least one of an opening and a contoured peripheral surface, wherein the at least one of the opening and the contoured peripheral surface is comprised of two milled grooves that create a local increase in resistance.

14. An electrical tubular heating element for producing a desired heating output, the electrical tubular heating element comprising:

a tubular metal sheath having an interior; and an electrical heating element positioned within the interior, the electrical heating element formed from a resistive rod and being electrically insulated from the tubular metal sheath at least in sections by an electrically insulating material, the resistive rod, from which the electrical heating element is formed, is penetrated by at least one of an opening and a contoured peripheral surface, wherein the at least one of the opening and the contoured peripheral surface is realized by a corrugated-tube-like construction of the electrical heating element.

* * * * *